Sept. 13, 1955 J. CARPENTIER 2,717,768
INSTALLATION FOR THE EXTRACTION AND TREATMENT
OF FATTY VEGETABLE MATERIALS
Filed Aug. 2, 1950 2 Sheets-Sheet 1

INVENTOR:
JACQUES CARPENTIER
By: Wenderoth, Lind + Ponack
Attorneys

Sept. 13, 1955   J. CARPENTIER   2,717,768
INSTALLATION FOR THE EXTRACTION AND TREATMENT
OF FATTY VEGETABLE MATERIALS
Filed Aug. 2, 1950   2 Sheets-Sheet 2

INVENTOR:
JACQUES CARPENTIER
BY: Wenderoth, Lind & Ponack
AttorNEYS

United States Patent Office 2,717,768
Patented Sept. 13, 1955

2,717,768

INSTALLATION FOR THE EXTRACTION AND TREATMENT OF FATTY VEGETABLE MATERIALS

Jacques Carpentier, La Madeleine, France, assignor to Societe d'Etudes et de Recherches Industrielles et Chimiques (S. E. R. I. C.), Lille, France, a limited company of France Application August 2, 1950, Serial No. 177,197

Claims priority, application France May 8, 1947

2 Claims. (Cl. 259—1)

The invention relates to a process and installation for the extraction of fatty substances from vegetable oil-yielding cells.

Numerous processes are known for extracting from oil yielding plants the fatty substances (oils, greases) they contain. Such processes utilize mechanical means, such as pressing, or physical means such as dissolution or chemical means.

All such processes entail more or less high losses in fatty materials.

An object of the invention is to make this extraction much weaker and to increase its efficiency.

Another object of the invention, is to provide an installation for the extraction according to the invention.

The process according to the invention includes the treatment of the oil yielding materials by supersonic waves, which facilitates the extraction and increases the efficiency.

According to another feature, the amount of gases dissolved in the cells to be treated supersonically is increased, which facilitates the action of supersonic waves.

According to another feature, the emulsion obtained by the supersonic treatment is broken, which gathers the fatty material into a continuous mass.

The breaking of the emulsion is obtained conveniently by treating the emulsion by low frequency supersonic waves.

The invention also extends to an installation for carrying out the above or a similar process, characterized in that it comprises an apparatus for supersonic treatment.

According to another feature, the installation comprises an apparatus for supersonic treatment for the extraction of fatty materials and a second apparatus for supersonic treatment for breaking the emulsion obtained in the first apparatus.

The invention also extends to the fatty materials obtained according to the above process, or with the above installation, or with a similar process or installation said fatty materials being characterized by an increased chemical activity.

The basic products to which the process according to the invention is applied may be raw vegetable products or products resulting from a partial extraction. This partial extraction is effected according to any method. The basic products may be obtained, for instance, from continuous presses or any other apparatus working by pressure and making it possible to extract, by any method, a fraction of the fatty substances contained in the raw material.

The vegetable substances to be treated are first brought to a condition of sufficient division for allowing their being carried away by mere pressure or by any other mechanical means in the treating installation.

This carrying away may be facilitated by adding to the mass a certain amount of liquid. This liquid may be, conveniently, a solvent for the fatty material. In such a case the solvent added by way of fluidifier may play an active part in the subsequent treatment of the fatty material.

To fluidify the mass, there may be used, for instance, a chlorinated or polychlorinated derivative may be used, or carbon tetrachloride or sulphide, or a hydrocarbon.

Water or suitable salt solutions may be used. In such a case, the pH of the liquid is selected according to the material to be treated. Generally, a high pH facilitates the emulsion of fatty materials.

The addition of auxiliary agents, such as suitable foam producing agents or emulsifiers may also be contemplated.

Before the raw materials, it may be advantageous to increase the amount of gases dissolved in the cells to be treated. Thus the evolution of bubbles under supersonic action is facilitated, the bubbles evolved facilitating the bursting of the cell walls.

To obtain this increase in the amount of dissolved gases, the products to be treated may be saturated by pressure with air, nitrogen, hydrogen or carbon dioxide, if the fatty material is a siccative.

A similar result is obtained if a partial fermentation of the vegetable products is previously effected. This treatment has the particular advantage of softening the cell walls and, consequently, of facilitating their breaking by supersonic waves.

When supersonic waves have to be used for the extraction of fatty materials impregnating a substance with a lacunose structure, it is possible to omit part of the above treatments as, for instance, the saturation with dissolved gases or the partial fermentation.

The raw materials, or, previously treated, as the case may be, as described above, are treated, according to the invention, with supersonic waves. The supersonic waves cause a molecular agitation which breaks the vegetable cells with or without the help of the internal pressure caused by gases which may possibly be evolved and emulsify the fats and oils contained in said cells.

The supersonic frequency is adjusted so as to obtain an average of $10^4$ to $10^6$ cycles per second. The optimum frequency is in the vicinity of $10^5$ to $3 \times 10^6$ cycles per second. The duration of the supersonic treatment may vary from a few seconds, but this latter frequency limitation is not imperative for all substances to be treated, to a few minutes, according to the material to be treated.

At the end of the supersonic treatment, an emulsion of fatty materials is obtained, polluted by cell residues of the products which contained the fats or oils. These impurities are segregated by any known process, such as filtering, super centrifugation, etc. . . . so as to obtain a clean emulsion.

The ulterior treatment of the emulsion is carried out in various manners, according to the purpose contemplated.

For instance, the fatty material may be removed by a solvent. This solvent may have been added, at least in part, during the prepartion of the raw materials as already indicated.

The emulsion may also be broken in any known manner, for gathering the fatty material into a continuous mass. To this effect, the emulsion is treated by electrophoresis or centrifugation, or the pH of the salty medium is suitably modified. Two or more such means may also be combined together.

The emulsion may be conveniently broken by subjecting it to low frequency supersonic waves.

The fatty materials may be treated chemically, directly in a finely emulsifiied condition, the emulsions of fatty materials obtained according to the process of the invention react almost instantaneously. Among the various chemical treatments which may be applied, one may mention saponification, deodorization, oxidation, hydrogenation, sulphonation, polymerization, etc.

There will now be described, by way of non-limitative example, an installation allowing the effecting of the process described.

Reference will be made to the appended drawing, wherein:

Figures 3 and 4 show detail views of supersonic apparatus.

The installation shown comprises a grinder A in which the fatty materials are ground to a suitable fineness. The mixing of raw materials and solvents, diluting agents and other auxiliary agents, as the case may be (foam producers, emulsifiers, etc.) is also effected in the grinder.

The raw material thus brought to a suitable condition of division and fluidity, is carried on by a circulation type pump 1 or an Archimedean screw to a saturation or fermentation bowl B. The raw material is saturated with dissolved gas or undergoes a fermentation and then passes to the supersonic apparatus C.

If desired, the raw material may pass directly from the grinder A to the supersonic apparatus C through a by-passing duct 2.

The supersonic apparatus C consists essentially of a small section tube or of a bundle of such tubes. The walls of the tube comprise, in places, windows closed by thin quartz plates 3, substantially parallel with the axis of the tube. The plates 3 are energized by condensers (not shown), receiving a high frequency alternating current. The supersonic generators are arranged in cavities which are just sufficient to contain the end portion of the piezo-electric quartz.

Figure 1:
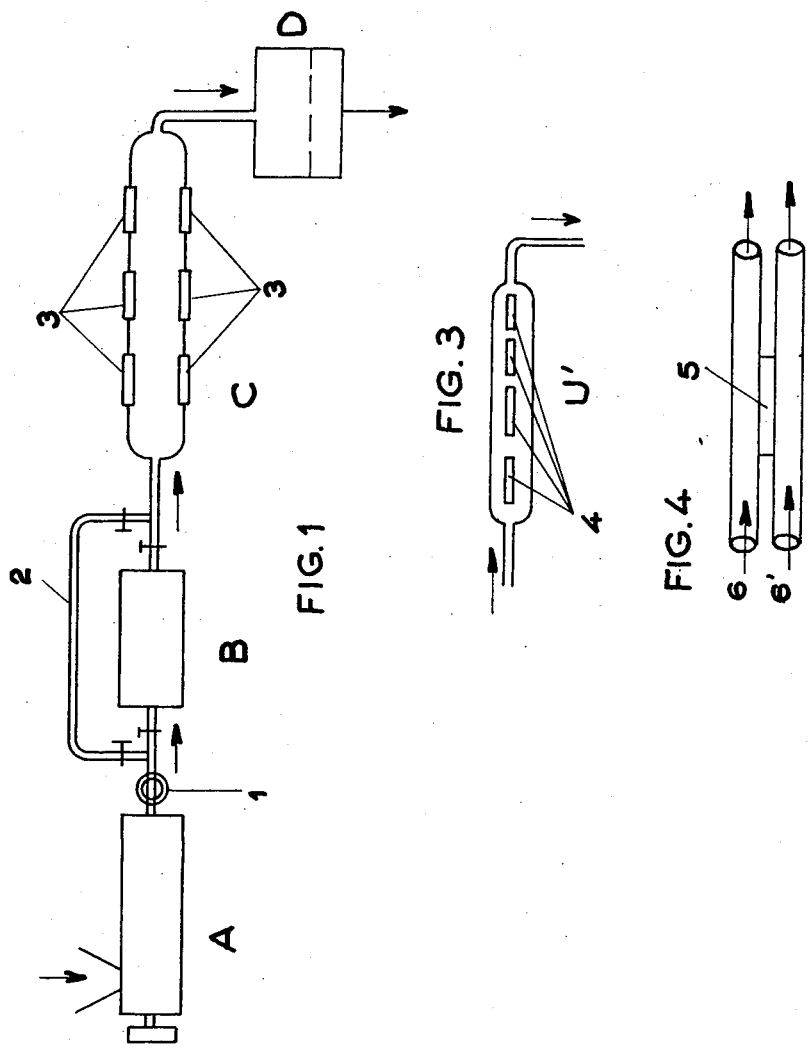
Figure 1 is a general diagram of an installation for the extraction and treatment of the fatty materials and Figure 2 shows one type of embodiment of an installation for the extraction of fatty materials by means of supersonic waves.
Figure 2:
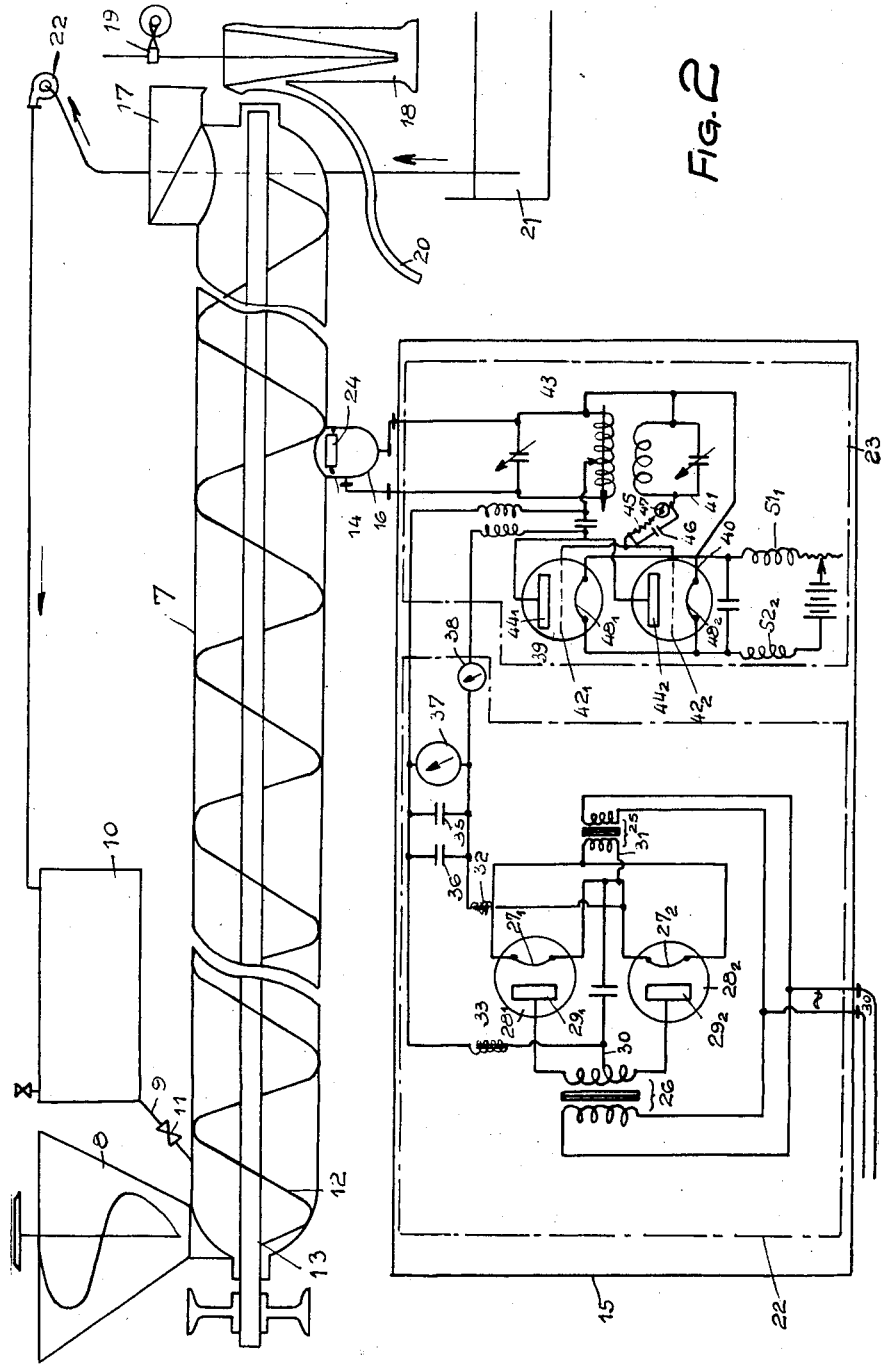

Figure 2 shows a practical type of embodiment for an installation for the extraction of fatty materials by means of supersonic waves.

This installation includes the treatment tube 7 receiving, on one hand, from the hopper 8, the grains to be treated, on the other hand, through the duct 9 connected with the tank 10 and controlled by a cock 11, a supersonic conducting liquid. The grains-liquid mixture is effected at the entrance to the treatment tube 7 and progresses along this tube by the action of an Archimedean screw 12 driven by a rotating shaft 13. The treatment tube 7 comprises, along one of its generatrices, a number of supersonic projectors 14, only one of which is shown on the figure. Each supersonic generator 14 is connected, on one hand, with the supersonic generator 15 and, on the other hand secured to the tube wall 7 in a cavity 16 provided to this effect.

Upon issuing from the tube 7 through the orifice 17, the mixture of liquid and fats treated is directed towards the centrifugal separator 18 driven by the electric motor 19.

The oil cakes issue from the centrifugal separator through the duct 20, while the liquid flows to the tank 21. The liquid contained in the tank 21 is sucked in by a pump 22 and forced into the tank 10.

The supersonic generator 15 comprises the three following main elements:

(1) The power supply arrangement 22 giving, from the alternating current from the electrical mains the alternating and direct voltages necessary for operating oscillator.

(2) The oscillator 23 generating an electrical voltage at a selected frequency in the supersonic range.

(3) The quartz crystals 24 forming the load circuit for the oscillator 23, each one of them located in one supersonic projector.

The power supply arrangement comprises two transformers 25 and 26, the primaries of which are connected with the mains 30. The secondary of the transformer supplies the cathodes $27_1$, $27_2$ of two diodes $28_1$ and $28_2$.

The secondary of transformer 26 supplies the anodes $29_1$ and $29_2$ of the diodes $28_1$ and $28_2$. The rectified D. C. voltage is taken between the mid-point 30 of the secondary of transformer 26 and one of the terminals 31 of secondary of the transformer 25.

Filters with inductances 32 and 33 and condensers 34 and 35 cause a maximum suppression of the fluctuations in the rectified voltage.

A voltmeter 37 and an ammeter 38 make it possible to control the power supply of the oscillator 23.

The oscillator comprises two triode tubes 39 and 40, in parallel, comprising a resonant circuit 41 between the grids $42_1$ and $42_2$, cut or as an oscillating circuit 43 mounted in the circuits of plates $44_1$ and $44_2$. The biassing of the grids $42_1$ and $42_2$ is ensured by a combination of a resistance 45 and capacity 46 comprising an ammeter 47 for measuring the grid current.

The power supply of the filaments $48_1$ and $48_2$ of the tubes 39 and 40 is insured by a voltage source 49 adjusted by means of a rheostat 50 with the interposition of choke coils $51_1$ and $51_2$.

Each quartz 24 is mounted in parallel at the terminals of the oscillating circuit 43 placed in the circuits of the plates $44_1$, $44_2$.

The dimensions of the treating tube 7, by way of indication are as follows:

Length of the tube _____ 10 meters.
Tube diameter _____ 30 centimeters.

According to one modification shown on Figure 3, a flat tube or a bundle of flat tubes are used, which contain, in the vicinity of their plane of symmetry, quartz slabs 4 the two faces of which are in contact with the product to be treated.

Figure 4 shows another modification according to which one quartz slab 5 is used for generating supersonic waves in two contiguous tubes 6 and 6', which are provided with suitable windows, facing each other.

It may be advantageous to use as quartz slabs, samples from a crystal which is as much twinned as possible.

One particularly advantageous type of embodiment consists in inclining, relatively to each other, the quartz crystals facing or following each other. Thus the microeddies and local pressure variations are multiplied, on which depend the burstings of the cells, the segregation of the fatty substances from their supports and their emulsion in the ambient liquid.

The periods of the supersonic waves are adjusted so as to generate $10^4$ to $5 \times 10^6$ cycles per second, and preferably from $10^5$ to $3 \times 10^6$ cycles per second; the power absorbed by each one of the quartz crystals varies according to the difficulty of extraction of the fatty substance, from one hectowatt to several kilowatts.

Upon issuing from the supersonic apparatus C, the emulsion obtained flows through a filter D where it is freed from the cellular residues or materials, which held the fatty materials. Instead of filter D, any other apparatus could be used, making it possible to obtain the same result, such as a supercentrifugal machine.

The emulsion then passes to the apparatus for ulterior treatment, not shown. This apparatus may comprise, particularly, a supersonic apparatus similar to the one just described, for breaking the emulsion by application thereto of low frequency supersonic waves. Here again, it may be advantageous to incline the quartz slabs with respect to one another to multiply the local pressure variations, and, consequently, facilitate the breaking of the emulsion.

There will now be described, by way of example only, a type of practical embodiment of the process according to the invention.

The raw material subjected to the treatment, in this type of embodiment, is linseed. Linseed, previously crushed or not, in suspension in a liquid solvent, continuously arrive in the crusher mixer A.

The liquid solvent may be an aqueous solution of alkaline sulphonates or organic solvent, such as trichlorethylene, gasoline or benzol. The weight of the seeds and the weight of the solvent introduced into the mixer A are substantially equivalent.

From the mixer A, the mixture is driven by an Archimedean screw directly to the supersonic apparatus C. The mixture, although freshly prepared, should always be in a sufficient quantity in the mixture A to avoid stops in the supply. This is very important, since the liquid constitutes the conducting medium for the supersonic waves so that it is essential that apparatus C in which the supersonic waves are generated, should always be filled with liquid.

In the supersonic apparatus C, where the period of the supersonic waves is, for instance between 20 kilocycles and 970 kilocycles, molecular agitation causes the cells to burst. An emulsion of fatty materials is obtained, polluted with cellular residues.

The energy drawn by the apparatus C generally reaches 140 w. for the supersonic frequency indicated.

The mixture thus treated falls on a sifter or filter D which segregates the vegetable materials in suspension from the oil solution.

The treatments at the end of operation vary according to the nature of the solvent used. The residues which remain at the end of the extraction hardly contain 10% of the oil initially contained in the linseed. The extraction may be made more complete by again passing the residues through the extraction apparatus.

The treatment by saturation by gas in the above mentioned bowl B, may be used in particular cases for obtaining a medium as little oxygenated as possible, for the purpose of preserving the siccative qualities of the oils to be extracted. Due to the extreme division of the substance and the local temperature rises which one endeavours to reduce to a minimum (for instance by a water flow around apparatus O), oxidation is to be feared if all precautions are not taken to avoid it.

Fermentation may be utilized for the purpose of obtaining already evolved products, for special uses. It facilitates ulterior extraction, however, in case the treated grains have been left in evolution in the presence of damaged grains causing the seeding.

Of course, the process and installation according to the invention are not limited to the particular types of embodiment which have been described and represented. Numerous modifications can be considered within the scope of the invention.

The invention makes it possible to obtain fatty materials easily from vegetable products containing such materials. The extraction is effected with a very small loss of fatty material and a considerable saving in time and money.

The invention also makes it possible to obtain emulsions of fatty materials which are very reactive and which may be subjected directly to chemical reactions.

This application is a continuation in part of application Serial No. 773,456, filed September 11, 1947, now abandoned.

What is claimed is:

1. In an installation for extracting fatty substances, starting from oily vegetable cells, a tube receiving the material to be treated, the walls of the said tube having electrically insulated windows therein constructed of stoppers which serve as supports for a thin plate of quartz substantially parallel to the axis of the tube, means for exciting the quartz plate by means of a high-frequency current, and an Archimedean screw insuring the mixing of the product to be treated and its advance from the inlet to the outlet of the tube.

2. In an installation for extracting fatty substances, starting from oily vegetable cells, a tube receiving the material to be treated, quartz sheets placed near the plane of symmetry of said tube, one of the two faces of said quartz sheet being in contact with the cells to be treated, condensers receiving a high-frequency alternating current for exciting said quartz sheets, and an Archimedean screw for mixing the product being treated and advancing the product from the inlet to the outlet of the tube.

References Cited in the file of this patent

UNITED STATES PATENTS

| Number | Name | Date |
|---|---|---|
| 2,163,650 | Weaver | June 27, 1939 |
| 2,257,997 | Barnes | Oct. 7, 1941 |
| 2,407,462 | Whitely | Sept. 10, 1946 |
| 2,448,372 | Horsely | Aug. 31, 1948 |